(No Model.)  2 Sheets—Sheet 1.

F. FOWLER.
TRICYCLE.

No. 248,441.  Patented Oct. 18, 1881.

Witnesses:
Edmond Brodhag
Philip F. Larner

Inventor:
Francis Fowler
by Johnson & Johnson
Attys (No Model.)  
F. FOWLER.  
TRICYCLE.  
2 Sheets—Sheet 2
No. 248,441.  Patented Oct. 18, 1881.
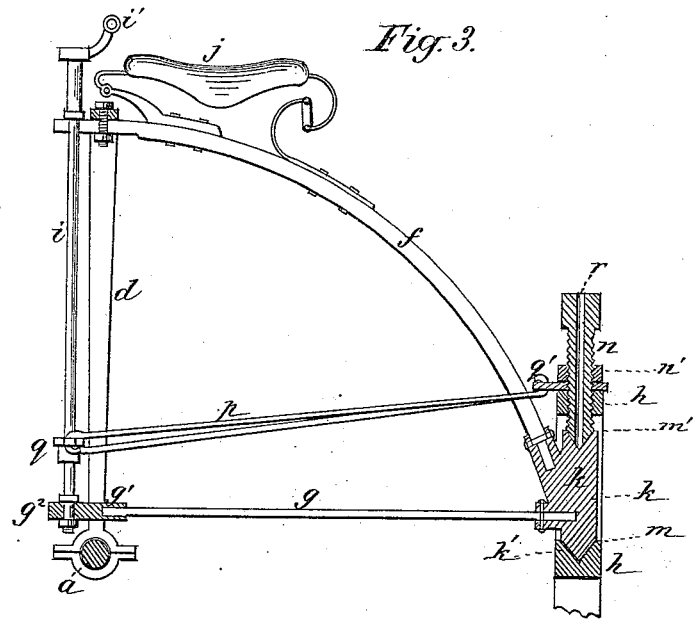
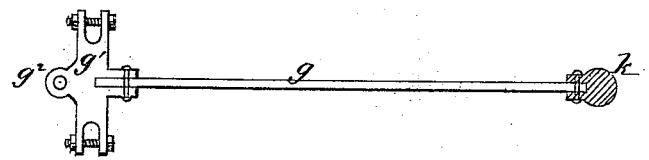
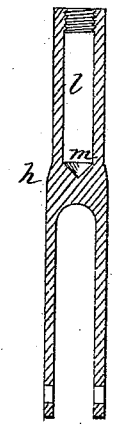
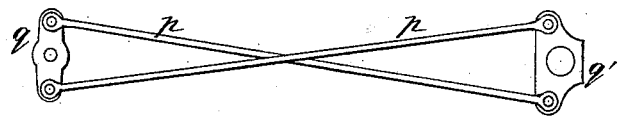
Witnesses:  
Emond Brodhag  
Philip F. Larner  
Inventor:  
Francis Fowler  
by Johnson & Johnson  
Attys

UNITED STATES PATENT OFFICE.

FRANCIS FOWLER, OF NEW HAVEN, CONNECTICUT.

TRICYCLE.

SPECIFICATION forming part of Letters Patent No. 248,441, dated October 18, 1881.

Application filed June 20, 1881. (No model.)

*To all whom it may concern:*

Be it known that I, FRANCIS FOWLER, a citizen of the United States, residing at New Haven, in the county of New Haven and State of Connecticut, have invented new and useful Improvements in Tricycles, of which the following is a specification.

The style of tricycle which I have improved is that having a sloping or curved reach and front propelling-wheels driven by oppositely-arranged foot-rests of the crank-axle. In my improved tricycle the reach-supporting wheel forms the guiding-wheel, and the fork or yoke of the front driven wheels is fixed to the front end of the reach. A horizontal brace connects the lower end of the front fork with the rear end of the curved reach, and the front ends of both the brace and the reach extend in front of the front fork or yoke and form the bearings for the steering-post. The rear end of the reach is provided with a vertical double-ended bearing-pin, and the rear fork is adapted to receive said vertical bearing-pin and form therewith its lower pivot-bearing, while an adjustable screw entering the top of said fork forms the upper pivot-bearing for said pin and in vertical line with it. Cross-rods connect the lower end of the steering-post with the rear fork, and the guiding is effected by swiveling the latter upon the vertical pivot bearing-pin of the reach. By this construction the tricycle is simplified and easily guided.

Figure 1:
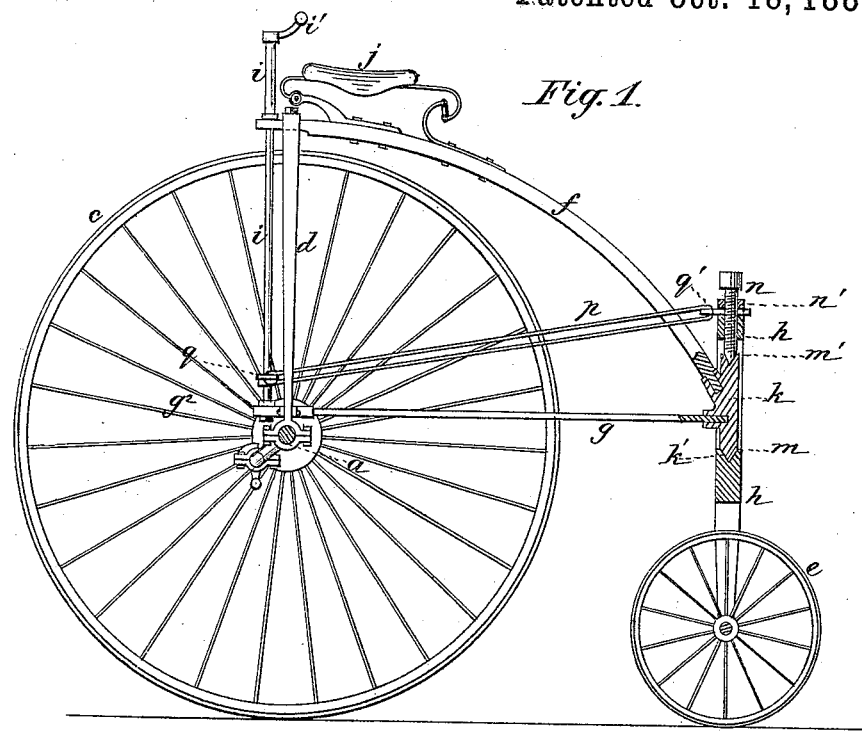
Figure 2:
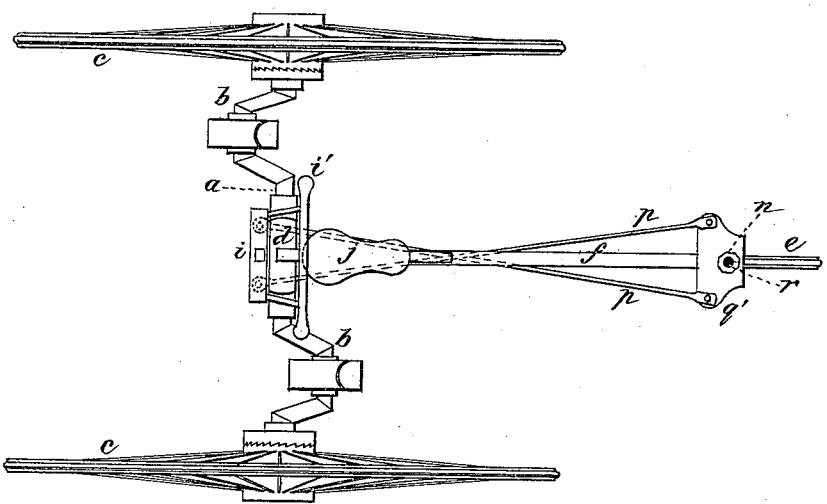

Referring to the accompanying drawings, Figure 1 represents a vertical section of a tricycle embracing my improvements; Fig. 2, a top view. Fig. 3 shows the rigidly-connected reach, the front fork, and the brace; Fig. 4, the rear fork; Fig. 5, the brace; Fig. 6, the crossed steering-post rods, and Fig. 7 one of said rods.

The crank-axle $a$ is formed with oppositely-arranged cranks $b$, provided with foot-rests by which the front wheels, $c$, are driven, and the reach-supporting yoke $d$ is mounted upon the axle between the cranks. A small wheel, $e$, supports the rear end of the curved reach $f$ by an independent swiveling fork, and the driven wheels are mounted upon the ends of the crank-axle. The front yoke, $d$, is firmly bolted to the upper front end of the reach, while the lower or rear end of the latter is connected to said front yoke by a horizontal brace, $g$, forming a rigidly-connected frame, upon which the rear fork, $h$, is adapted to have a swiveling movement in guiding the tricycle. The reach and the brace extend in front of the fixed yoke and form the bearings for the steering-post $i$, which is operated by the rider from his seat $j$, mounted upon the reach.

The rear end of the reach is provided or formed with a vertical bearing-pin, $k$, upon which the rear fork, $h$, is adapted to have a swiveling connection above the supporting-wheel, being for this purpose provided with a vertical slot, $l$, having a seat, $m$, for the lower pivot-point, $k'$, of the pin $k$, while a screw, $n$, passing vertically through the upper end of said fork, enters its slot $l$ at the top and forms the seat $m'$ for the upper pivot-point of the bearing-pin. The screw forms an adjustable seat for the bearing-pin and the means for securing the reach to the guiding-fork, and when set it is secured by a lock-nut, $n'$, screwed upon the upper end of the fork. The screw has a central through-passage, $r$, in vertical line with and communicating with the bearing-pin, and forms a convenient means for oiling the bearing-pin seats, the said screw being adjusted as may be required by wear and to prevent rattling.

The steering-post and the swiveling fork are connected by crossed rods $p$, as shown in Fig. 6, which pass through the yoke and on each side of the reach, so that by turning the handle $i'$ of the steering-post the reach-supporting wheel-yoke will be swiveled upon its bearing-pin to guide the tricycle. In this action the crossed rods operate with a pulling and a pushing force. The connection of these rods with the steering-post is made by an armed attachment, $q$, and a similar attachment, $q'$, serves to connect said rods to the top of the swiveling fork. A convenient means of securing the fork attachment for the guiding-rods is by the clamping action of the lock-nut of the adjustable screw. The crossed rods are pivotally connected to their armed attachments.

The brace is preferably of tubing, and is suitable bolted to the front yoke by a cross-head, $g'$, having an eyed extension, $g^2$, for the lower bearing of the steering-post, while both the brace and the reach are secured to the bearing-pin by suitable extensions thereof, or in any proper way. The brace is important as a means of giving strength and stiffness to the reach or "back-bone," and relieving the crossed guiding-rods of all strain. But for this function of the brace there would be more or less strain upon the guiding-rods exerted in a manner tending to wear the bearing-pin pivots irregularly and to displace them from their seats. The brace, the reach, and the front yoke form a rigid frame upon which the swiveling fork and the steering-post are mounted, and the guiding-rods connecting the swiveling yoke renders it easy to direct the velocipede.

The seat is suitably mounted upon springs, the fixed yoke is provided with anti-friction-roll bearings for the crank-axle, and the driven wheels may be fixed or fitted loosely upon the axle with provision for effecting the driving-connection therewith.

I have stated that I have improved a certain structure of tricycle, and I mean such as patented to me February 3, 1880, and May 11, 1880, in which the front driven wheels serve as the steering-wheels. My present improvements embrace matters of construction and combinations which will be specifically pointed out in the claims, and from which it will appear that the steering device is embraced only as an element of a combination, and that a rigid frame composed of the curved reach, the front yoke, and a brace is embraced only as an element of a combination with other elements which enter into the structure of my improved tricycle.

I claim—

1. The combination, in a tricycle having front driven wheels, of the front yoke, $d$, the curved reach connected therewith and provided with a rear double-ended bearing-pin, $k$, and the brace $g$ composing a rigid frame, substantially as described, with the vertical steering-post $i$, the rear swiveling fork, $h$, and the crossed rods $p$, connecting said steering-post and rear fork, the said pin $k$ having vertical endwise bearings within the swiveling yoke, substantially as described, for the purpose specified.

2. In a tricycle having front driven wheels and a rigid frame composed of the curved reach $f$, the front yoke, $d$, and a brace, $g$, the said reach having a double-ended bearing-pin, $k$, in combination with the rear wheel-fork, $h$, having a fixed and an adjustable seat for said bearing-pin, the front steering-post, $i$, and means for connecting said rear-wheel fork with the steering-post, substantially as described, for the purpose specified.

3. The combination, in a tricycle having front driven wheels and a rigid frame composed of the curved reach $f$, the front yoke, $d$, and a brace, $g$, the said reach having a double-ended bearing-pin, $k$, with the steering-post $i$, the rear swiveling fork, $h$, having a bearing-seat, $m$, the adjustable bearing-screw $n$, the lock-nut $n'$, and the steering-rods $p$, substantially as described, for the purpose specified.

4. The combination, in a tricycle having front driven wheels and a rear guiding-wheel, of the reach $f$, having a double-ended bearing-pin, $k$, braced substantially as described, with the swiveling fork $h$, having the seat $m$, the bearing-screw $n$, having a passage, $r$, coincident and communicating with said double-ended reach-pin, substantially as described, for the purpose specified.

In testimony whereof I have hereunto set my hand in the presence of two subscribing witnesses.

FRANCIS FOWLER.

Witnesses:
GEO. A. ISBELL,
FRANK C. SWIFT.